United States Patent
Hosoda et al.

(10) Patent No.: US 10,304,583 B2
(45) Date of Patent: May 28, 2019

(54) INSULATING TAPE FOR COVERING, AND METHOD FOR PRODUCING STRUCTURE

(71) Applicant: AGC Inc., Tokyo (JP)

(72) Inventors: Tomoya Hosoda, Tokyo (JP); Yasuhiko Matsuoka, Tokyo (JP); Toru Sasaki, Tokyo (JP); Wataru Kasai, Tokyo (JP)

(73) Assignee: AGC Inc., Tokyo (JP)

( * ) Notice: Subject to any disclaimer, the term of this patent is extended or adjusted under 35 U.S.C. 154(b) by 682 days.

(21) Appl. No.: 14/944,657

(22) Filed: Nov. 18, 2015

(65) Prior Publication Data

US 2016/0078979 A1    Mar. 17, 2016

Related U.S. Application Data

(63) Continuation of application No. PCT/JP2014/067704, filed on Jul. 2, 2014.

(30) Foreign Application Priority Data

Jul. 4, 2013   (JP) .................................. 2013-140960
Dec. 12, 2013  (JP) .................................. 2013-257487

(51) Int. Cl.
| | |
|---|---|
| *H01B 3/30* | (2006.01) |
| *B32B 27/08* | (2006.01) |
| *H01B 3/44* | (2006.01) |
| *C08F 214/26* | (2006.01) |
| *C08J 5/12* | (2006.01) |
| *B32B 27/28* | (2006.01) |
| *B29C 65/02* | (2006.01) |
| *B29C 65/00* | (2006.01) |
| *H01B 13/08* | (2006.01) |
| *B32B 27/18* | (2006.01) |
| *B32B 27/20* | (2006.01) |
| *B32B 27/30* | (2006.01) |
| *B32B 27/32* | (2006.01) |
| *B29K 627/18* | (2006.01) |
| *B29K 679/00* | (2006.01) |
| *B29L 9/00* | (2006.01) |
| *B29L 31/34* | (2006.01) |
| *B29C 63/00* | (2006.01) |
| *B29C 63/02* | (2006.01) |

(52) U.S. Cl.
CPC ........... *H01B 3/306* (2013.01); *B29C 65/022* (2013.01); *B29C 66/5326* (2013.01); *B32B 27/08* (2013.01); *B32B 27/18* (2013.01); *B32B 27/20* (2013.01); *B32B 27/281* (2013.01); *B32B 27/304* (2013.01); *B32B 27/322* (2013.01); *C08F 214/262* (2013.01); *C08J 5/121* (2013.01); *H01B 3/445* (2013.01); *H01B 13/0891* (2013.01); *B29C 63/0065* (2013.01); *B29C 63/02* (2013.01); *B29K 2627/18* (2013.01); *B29K 2679/08* (2013.01); *B29L 2009/00* (2013.01); *B29L 2031/3412* (2013.01); *B29L 2031/3462* (2013.01); *B32B 2250/24* (2013.01); *B32B 2307/206* (2013.01); *B32B 2307/306* (2013.01); *B32B 2307/50* (2013.01); *B32B 2307/54* (2013.01); *B32B 2307/712* (2013.01); *B32B 2307/714* (2013.01); *B32B 2457/00* (2013.01); *B32B 2457/04* (2013.01); *B32B 2605/18* (2013.01); *C08J 2327/12* (2013.01); *C08J 2379/08* (2013.01)

(58) Field of Classification Search
None
See application file for complete search history.

(56) References Cited

U.S. PATENT DOCUMENTS

| | | | |
|---|---|---|---|
| 3,616,177 A * | 10/1971 | Gumerman | C08J 7/047 174/110 FC |
| 4,801,506 A | 1/1989 | Motonari et al. | |
| 5,006,411 A | 4/1991 | Motonari et al. | |
| 2003/0162923 A1 | 8/2003 | Funaki et al. | |
| 2004/0142134 A1 | 7/2004 | Funaki et al. | |
| 2006/0088680 A1 | 4/2006 | Kitahara et al. | |
| 2006/0093827 A1 | 5/2006 | Funaki et al. | |
| 2008/0102285 A1 | 5/2008 | Aida et al. | |

(Continued)

FOREIGN PATENT DOCUMENTS

| | | |
|---|---|---|
| JP | 62-162542 | 7/1987 |
| JP | 62-162543 | 7/1987 |

(Continued)

OTHER PUBLICATIONS

International Search Report dated Sep. 22, 2014 in PCT/JP2014/067704 filed Jul. 2, 2014.

*Primary Examiner* — Jeffry H Aftergut
(74) *Attorney, Agent, or Firm* — Oblon, McClelland, Maier & Neustadt, L.L.P.

(57) ABSTRACT

To provide an insulating tape for covering, in which a polyimide film and a fluorinated resin film are laminated with excellent adhesion, and a method for producing a structure, which comprises covering a conductor with such an insulating tape for covering, followed by thermal treatment. The insulating tape for covering, comprises a polyimide film and a fluorinated resin film directly laminated on one or both surfaces of the polyimide film, wherein the fluorinated resin film contains a fluorinated copolymer (A) which has a melting point of from 220 to 320° C. and can be melt-molded and which has at least one type of functional groups selected from the group consisting of carbonyl group-containing groups, hydroxy groups, epoxy groups and isocyanate groups.

9 Claims, No Drawings

(56) References Cited

U.S. PATENT DOCUMENTS

2008/0281065 A1    11/2008  Kitahara et al.
2011/0201774 A1     8/2011  Kitahara et al.
2012/0219767 A1*   8/2012  Ting .......................... B32B 7/12
                                                                     428/195.1

FOREIGN PATENT DOCUMENTS

| JP | 8-34102 | | 2/1996 |
|----|---------|---|--------|
| JP | 10-100340 | | 4/1998 |
| JP | 3023329 | | 3/2000 |
| JP | 2000-211081 | | 8/2000 |
| JP | 2004-238405 | | 8/2004 |
| JP | 2005-23261 | | 1/2005 |
| JP | 2005-254810 | | 9/2005 |
| JP | 2006-152234 | | 6/2006 |
| JP | 2006-297843 | | 11/2006 |
| JP | 3945947 | | 7/2007 |
| JP | 2010-53209 | | 3/2010 |
| JP | 2012-209391 A | * | 10/2012 |
| WO | WO 2004/058833 | | 7/2004 |
| WO | WO 2006/134764 | | 12/2006 |

* cited by examiner

INSULATING TAPE FOR COVERING, AND METHOD FOR PRODUCING STRUCTURE

TECHNICAL FIELD

The present invention relates to an insulating tape for covering, and a method for producing a structure having a conductor covered with the insulating tape for covering.

BACKGROUND ART

In production of an electric cable, it is common to cover a conductor with an insulating material. As one of methods for producing electric cables, there is a method in which an insulating tape prepared by processing a laminate having a fluorinated resin layer formed on one or both surfaces of a polyimide film, into a tape form, is wound on the surface of a conductor to cover the surface. In such a method, in order to secure insulating properties of the conductor surface, it is usual to heat-seal the fluorinated resin layer after covering the conductor with the insulating tape.

Such an insulating tape is preferably used for aerospace applications, since the polyimide is excellent in properties such as heat resistance, etc. and the fluorinated resin is excellent in electric insulating properties, heat resistance, chemical resistance, weather resistance, etc. Further, in recent years, along with progress in high performance and high functionality of electric equipments, electric cables used for such electric equipments have been likely to be exposed to a high temperature, high humidity environment. Further, there are many cases wherein the amount of current increases, and due to heat generation, the electric cable is likely to be exposed to a higher temperature. The above insulating tape is expected to be useful also for such applications.

In the insulating tape, as the fluorinated resin, a polytetrafluoroethylene (PTFE), a tetrafluoroethylene/hexafluoropropylene copolymer (FEP) or the like is used (see e.g. Patent Documents 1 and 2). Particularly, as the outer-most layer, a PTFE layer is formed in many cases, from the viewpoint of the electrical insulating properties and weather resistance.

As the method for producing such an insulating tape, a method of coating a polyimide film with a dispersion of a fluorinated resin, is common.

However, this method has such a problem that the productivity is no good. For example, in order to bring the fluorinated resin layer to have a certain thickness, it is required to repeat application and drying of the dispersion, which requires time and effort. Further, thermal treatment at a high temperature is required at the time of producing the insulating tape or at the time of producing an electric cable by using the insulating tape. For example, at the time of producing an electric cable by using an insulating tape, usually, the insulating tape is wound spirally on a conductor so that the tape would overlap itself, and then, thermal treatment is conducted to fuse the insulating tape to itself to seal a space in the wound insulating tape. The thermal treatment at that time serves also as a sintering step, and, for example, in the case of PTFE, thermal treatment at a temperature of at least 360° C. will be required after winding an insulating tape provided with a non-sintered PTFE layer, on a conductor. Especially when it is desired to complete the thermal treatment in a short time (e.g. in about one hour), it is required to conduct heating at a temperature of at least 400° C.

As a method for producing a laminate having a fluorinated resin layer, there is also a method wherein a fluorinated resin film and another film are laminated by e.g. thermal lamination or extrusion lamination.

However, an insulating tape obtained by laminating a PTFE film and a polyimide film, has such a problem that the adhesion between the films is low. According to a study by the present inventors, in the case of an insulating tape obtained by laminating a PTFE film and a polyimide film, there is such a problem that even if the above-mentioned thermal treatment is conducted after winding the insulating tape on a conductor, the adhesion between the PTFE film and the polyimide film stays to be low, and peeling is likely to occur between these films during or after the production of an electric cable.

If the thermal treatment temperature is raised, although the adhesion between the PTFE film and the polyimide film may possibly be improved to some extent, the resin, particularly the polyimide having a low heat resistance as compared with PTFE, is likely to be deteriorated, and the production costs will also be increased.

The adhesion of a FEP film to a polyimide film is better than that of a PTFE film, but cannot be said to be adequate, and if the FEP film is laminated on a polyimide film, there will be the same problem as in the case of the PTFE film.

PRIOR ART DOCUMENTS

Patent Documents

Patent Document 1: JP-A-10-100340
Patent Document 2: JP-A-2000-211081

DISCLOSURE OF INVENTION

Technical Problem

The present invention has been made in view of the above-mentioned situation, and has an object to provide an insulating tape for covering, wherein a polyimide film and a fluorinated resin film are laminated with excellent adhesion, and a method for producing a structure by covering a conductor with such an insulating tape for covering, followed by thermal treatment.

Solution to Problem

The present invention has the following constructions [1] to [13] and provides an insulating tape for covering and a method for producing a structure.
[1] An insulating tape for covering, which comprises a polyimide film and a fluorinated resin film directly laminated on one or both surfaces of the polyimide film, wherein the fluorinated resin film contains a fluorinated copolymer (A) which has a melting point of from 220 to 320° C. and can be melt-molded and which has at least one type of functional groups selected from the group consisting of carbonyl group-containing groups, hydroxy groups, epoxy groups and isocyanate groups.
[2] The insulating tape for covering according to the above [1], wherein the melting point of the fluorinated copolymer (A) is from 260 to 320° C.
[3] The insulating tape for covering according to the above [1] or [2], wherein the carbonyl group-containing groups are at least one type selected from the group consisting of groups containing a carbonyl group between carbon atoms of a hydrocarbon group, carbonate groups, carboxy groups, haloformyl groups, alkoxycarbonyl groups and acid anhydride residual groups.

[4] The insulating tape for covering according to any one of the above [1] to [3], wherein the content of the functional groups is from 10 to 60,000 groups to $1 \times 10^6$ carbon atoms in the main chain of the fluorinated copolymer (A).

[5] The insulating tape for covering according to any one of the above [1] to [4], wherein the fluorinated copolymer (A) has a melt flow rate of from 0.5 to 15 g/10 min., as measured at 372° C. under a load of 49N.

[6] The insulating tape for covering according to any one of the above [1] to [4], wherein the fluorinated copolymer (A) has a melt flow rate of from 0.5 to 25 g/10 min., as measured at 297° C. under a load of 49N.

[7] A method for producing a structure, which comprises a step of covering the surface of a conductor with the insulating tape for covering as defined in any one of the above [1] to [6] to form a covering layer, and a step of thermally treating the conductor covered with the covering layer at a temperature of at least the melting point of the fluorinated copolymer (A) to obtain a structure.

[8] A method for producing a structure, which comprises a step of covering the surface of a conductor with the insulating tape for covering as defined in any one of the above [1] to [6] to form a first covering layer, a step of covering the surface of the first covering layer with a tape containing a polytetrafluoroethylene to form a second covering layer, and a step of thermally treating the conductor covered with the first and second covering layers at a temperature of at least the melting point of the fluorinated copolymer (A) to obtain a structure.

[9] A method for producing a structure, which comprises a step of covering the surface of a conductor with a tape-form fluorinated resin film to form a first covering layer, a step of covering the surface of the first covering layer with a tape-form polyimide film to form a second covering layer, and a step of thermally treating the conductor covered with the first and second covering layers to obtain a structure, wherein the fluorinated resin film contains a fluorinated copolymer (A) which has at least one type of functional groups selected from the group consisting of carbonyl group-containing groups, hydroxy groups, epoxy groups and isocyanate groups and which has a melting point of from 220 to 320° C. and can be melt-molded, and the thermal treatment is conducted at a temperature of at least the melting point of the fluorinated copolymer (A).

[10] A method for producing a structure, which comprises a step of covering the surface of a conductor with a tape-form fluorinated resin film to form a first covering layer, a step of covering the surface of the first covering layer with a tape-form polyimide film to form a second covering layer, a step of covering the surface of the second covering layer with a tape-form fluorinated resin film to form a third covering layer, and a step of thermally treating the conductor covered with the first, second and third covering layers to obtain a structure, wherein each of the fluorinated resin films forming the first and third covering layers contains a fluorinated copolymer (A) which has at least one type of functional groups selected from the group consisting of carbonyl group-containing groups, hydroxy groups, epoxy groups and isocyanate groups and which has a melting point of from 220 to 320° C. and can be melt-molded, and the thermal treatment is conducted at a temperature of at least the melting point of the fluorinated copolymer (A).

[11] The method for producing a structure according to the above [9] or [10], wherein the melting point of the fluorinated copolymer (A) is from 260 to 320° C.

[12] The method for producing a structure according to any one of the above [7] to [11], wherein the thermal treatment is conducted at a temperature of at least the melting point of the fluorinated copolymer (A) and lower than 400° C.

[13] The method for producing a structure according to any one of the above [7] to [12], wherein the structure is an electric cable.

Advantageous Effects of Invention

According to the present invention, it is possible to provide an insulating tape for covering, wherein a polyimide film and a fluorinated resin film are laminated with excellent adhesion, and a method for producing a useful structure by covering a conductor with such an insulating tape for covering, having high mechanical strength and excellent heat resistance, followed by thermal treatment.

DESCRIPTION OF EMBODIMENTS

[Insulating Tape for Covering]

The insulating tape for covering of the present invention (hereinafter sometimes referred to simply as "the insulating tape") comprises a polyimide film and a fluorinated resin film directly laminated on one or both surface of the polyimide film.

The fluorinated resin film is preferably laminated on both surfaces of the polyimide film.

The thickness of the insulating tape of the present invention is preferably from 3 to 3,000 µm, more preferably from 15 to 1,500 µm, particularly preferably from 25 to 750 µm. When the thickness of the insulating tape is at least the lower limit value in the above range, the electrical insulating properties will be excellent, and when it is at most the upper limit value in the above range, the flexibility will be excellent.

(Fluorinated Resin Film)

The fluorinated resin film contains a fluorinated copolymer (A).

The fluorinated copolymer (A) has a melting point of from 220 to 320° C., can be melt-molded and has at least one type of functional groups (hereinafter referred to also as "functional groups (I)") selected from the group consisting of carbonyl group-containing groups, hydroxy groups, epoxy groups and isocyanate groups.

As it has functional groups (I), the adhesion between the polyimide film and the fluorinated resin film containing such fluorinated copolymer (A) will be improved. This is considered to be attributable to some interactions (chemical reactions, etc.) which take place between functional groups (I) and functional groups e.g. carbonyl groups in the polyimide. Further, as it has functional groups (I), the adhesion between the fluorinated resin film and the conductor (such as copper, aluminum, etc.) covered with the insulating tape, and eventually the adhesion between the insulating tape and the conductor, will also be improved.

Functional groups (I) are located at least at one of main chain terminals and side chains in the fluorinated copolymer (A). Functional groups (I) in the fluorinated copolymer (A) may be of one type or of two or more types.

The fluorinated copolymer (A) preferably has at least carbonyl group-containing groups as functional groups (I).

The carbonyl group-containing groups are groups containing a carbonyl group (—C(=O)—) in their structures and may, for example, be groups containing a carbonyl group between carbon atoms in a hydrocarbon group, carbonate groups, carboxy groups, haloformyl groups, alkoxycarbonyl groups, acid anhydride residual groups, etc.

The above hydrocarbon group may, for example, be a $C_{2-8}$ alkylene group. Here, the number of carbon atoms in the alkylene group is the number of carbon atoms in a state not including the carbonyl group. The alkylene group may be linear or branched.

The haloformyl group is represented by —C(=O)—X (wherein X is a halogen atom). The halogen atom in the haloformyl group may, for example, be a fluorine atom, a chlorine atom, etc., and it is preferably a fluorine atom. That is, the haloformyl group is preferably a fluoroformyl group (referred to also as a "carbonyl fluoride group").

In the alkoxycarbonyl group, the alkoxy group may be linear or branched, and it is preferably a $C_{1-8}$ alkoxy group, particularly preferably a methoxy group or an ethoxy group.

The content of functional groups (I) in the fluorinated copolymer (A) is preferably from 10 to 60,000 groups, more preferably from 100 to 50,000 groups, further preferably from 100 to 10,000 groups, particularly preferably from 300 to 5,000 groups, to $1 \times 10^6$ carbon atoms in the main chain of the fluorinated copolymer (A).

When the content of functional groups (I) is at least the lower limit value in the above range, the adhesion between the fluorinated resin film and the polyimide film, and the adhesion between the fluorinated resin film and the conductor, will be superior, and when it is at most the upper limit value in the above range, a high degree of adhesion to the polyimide film will be obtainable at a low processing temperature.

The content of functional groups (I) can be measured by a method such as a nuclear magnetic resonance (NMR) analysis or an infrared absorption spectrum analysis. For example, by using a method such as an infrared absorption spectrum analysis as disclosed in JP-A-2007-314720, the proportion (mol %) of constituting units having functional groups (I) in all constituting units which constitute the fluorinated copolymer (A) may be obtained, and from such proportion, the content of functional groups (I) may be calculated.

The fluorinated copolymer (A) is preferably a copolymer comprising constituting units (a) based on tetrafluoroethylene (hereinafter referred to also as "TFE") and/or chlorotrifluoroethylene (hereinafter referred to also as "CTFE"), constituting units (b) based on a cyclic hydrocarbon monomer which has a dicarboxylic acid anhydride group and has a polymerizable unsaturated group in the ring, and constituting units (c) based on another monomer (excluding TFE, CTFE and a cyclic hydrocarbon monomer which has a dicarboxylic acid anhydride group and has a polymerizable unsaturated group in the ring).

Here, the dicarboxylic acid anhydride residual groups in the constituting units (b) correspond to functional groups (I).

The fluorinated copolymer (A) may have functional groups (I) as main chain terminal groups. The functional groups (I) as main chain terminal groups are preferably alkoxycarbonyl groups, carbonate groups, hydroxy groups, carboxy groups, fluoroformyl groups, acid anhydride residual groups, etc. These functional groups can be introduced by suitably selecting a radical polymerization initiator, a chain transfer agent, etc. to be used at the time of producing the fluorinated copolymer (A).

In the present invention, "a cyclic hydrocarbon monomer which has a dicarboxylic acid anhydride group and has a polymerizable unsaturated group in the ring" (hereinafter referred to also as "a cyclic hydrocarbon monomer") is a cyclic hydrocarbon made of at least one 5- or 6-membered ring and yet is a polymerizable compound having a dicarboxylic acid anhydride group and an endocyclic polymerizable unsaturated group.

The cyclic hydrocarbon is preferably a cyclic hydrocarbon having at least one bridged polycyclic hydrocarbon. That is, a cyclic hydrocarbon composed of a bridged polycyclic hydrocarbon, a cyclic hydrocarbon having two or more bridged polycyclic hydrocarbons condensed, or a cyclic hydrocarbon having a bridged polycyclic hydrocarbon and another cyclic hydrocarbon condensed, is preferred.

The cyclic hydrocarbon monomer has at least one endocyclic polymerizable unsaturated group i.e. polymerizable unsaturated group present between carbon atoms constituting a hydrocarbon ring.

The cyclic hydrocarbon monomer further has a dicarboxylic acid anhydride group (—CO—O—CO—). The dicarboxylic acid anhydride group may be bonded to two carbon atoms constituting a hydrocarbon ring, or may be bonded to exocyclic two carbon atoms.

Preferably, the dicarboxylic acid anhydride group is bonded to two carbon atoms which are carbon atoms constituting the ring of the above mentioned cyclic hydrocarbon and which are adjacent to each other. Further, to carbon atoms constituting the ring of the cyclic hydrocarbon, halogen atoms, alkyl groups, halogenated alkyl groups or other substituents may be bonded instead of hydrogen atoms.

Specific examples of the cyclic hydrocarbon monomer may be compounds represented by the formulae (1) to (8), maleic anhydride, etc. Here, R in the formulae (2), (5) to (8) represents a $C_{1-6}$ lower alkyl group, a halogen atom selected from a fluorine atom, a chlorine atom, a bromine atom and an iodine atom, or a halogenated alkyl group having hydrogen atom(s) in the above lower alkyl group substituted by halogen atom(s).

One of these cyclic hydrocarbon monomers may be used alone, or two or more of them may be used in combination.

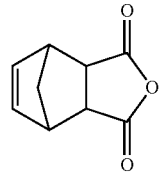

Formula (1)

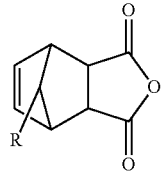

Formula (2)

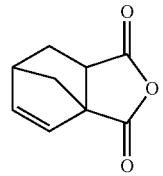

Formula (3)

Formula (4)
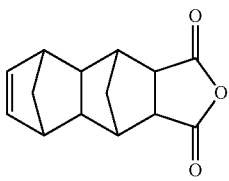

Formula (5)
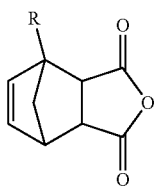

Formula (6)
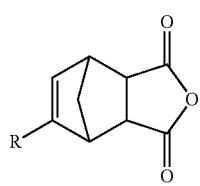

Formula (7)
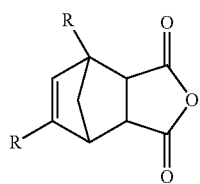

Formula (8)
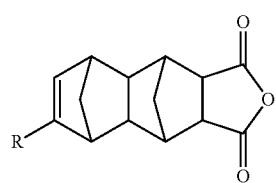

The cyclic hydrocarbon monomers of the above formulae (1) to (8) are per se known compounds, and they can be easily produced, for example, by a method of heating cyclopentadiene and maleic anhydride in the absence of a catalyst, or by a method disclosed in JP-A-6-73043. Or, commercially available cyclic hydrocarbon monomers may be used.

As the cyclic hydrocarbon monomer, among the above-mentioned ones, at least one member selected from the group consisting of itaconic anhydride (hereinafter referred to also as "IAH"), citraconic anhydride (hereinafter referred to also as "CAH") and 5-norbornene-2,3-dicarboxylic acid anhydride (hereinafter referred to also as "NAH") is preferred. When at least one member selected from the group consisting of IAH, CAH and NAH is used, it is possible to easily produce a fluorinated copolymer (A) containing acid anhydride residual groups, without necessity to employ a special polymerization method (see JP-A-11-193312) required in the case of employing maleic anhydride.

Among IAH, CAH and NAH, IAH or NAH is preferred, since the adhesion to the polyimide film will be thereby superior.

Another monomer (excluding TFE, CTFE and the cyclic hydrocarbon monomer) to form constituting units (c) may be a fluorinated monomer (excluding TFE and CTFE), a non-fluorinated monomer (excluding the cyclic hydrocarbon monomer), or a mixture thereof.

The fluorinated monomer to form constituting units (c) is preferably a fluorinated compound having one polymerizable double bond, e.g. vinyl fluoride, vinylidene fluoride (hereinafter referred to also as "VdF"), a fluoro-olefin (excluding TFE and CTFE), such as trifluoroethylene or hexafluoropropylene (hereinafter referred to also as "HFP"), $CF_2=CFOR^{f1}$ (wherein $R^{f1}$ is a $C_{1-10}$ perfluoroalkyl group which may contain an oxygen atom between carbon atoms), $CF_2=CFOR^{f2}SO_2X^1$ (wherein $R^{f2}$ is a $C_{1-10}$ perfluoroalkylene group which may contain an oxygen atom between carbon atoms, and $X^1$ is a halogen atom or a hydroxy group), $CF_2=CFOR^{f3}CO_2X^2$ (wherein $R^{f3}$ is a $C_{1-10}$ perfluoroalkylene group which may contain an oxygen atom between carbon atoms, and $X^2$ is a halogen atom or an alkyl group having at most 3 carbon atoms), $CF_2=CF(CF_2)_pOCF=CF_2$ (wherein p is 1 or 2), $CH_2=CX^3(CF_2)_qX^4$ (wherein $X^3$ is a hydrogen atom or a fluorine atom, q is an integer of from 2 to 10, and $X^4$ is a hydrogen atom or a fluorine atom), or perfluoro(2-methylene-4-methyl-1,3-dioxolane).

Among these fluorinated monomers, at least one member selected from the group consisting of VdF, HFP, $CF_2=CFOR^{f1}$ and $CH_2=CX^3(CF_2)_qX^4$ is preferred, and $CF_2=CFOR^{f1}$ or HFP is particularly preferred.

$CF_2=CFOR^{f1}$ may, for example, be $CF_2=CFOCF_2CF_3$, $CF_2=CFOCF_2CF_2CF_3$, $CF_2=CFOCF_2CF_2CF_2CF_3$ or $CF_2=CFO(CF_2)_8F$, and $CF_2=CFOCF_2CF_2CF_3$ (hereinafter referred to also as "PPVE") is preferred.

$CH_2=CX^3(CF_2)_qX^4$ may, for example, be $CH_2=CH(CF_2)_2F$, $CH_2=CH(CF_2)_3F$, $CH_2=CH(CF_2)_4F$, $CH_2=CF(CF_2)_3H$ or $CH_2=CF(CF_2)_4H$, and $CH_2=CH(CF_2)_4F$ or $CH_2=CH(CF_2)_2F$ is preferred.

The non-fluorinated monomer (excluding the cyclic hydrocarbon monomer) to form constituting units (c), is preferably a non-fluorinated compound having one polymerizable double bond, e.g. an olefin having at most 3 carbon atoms, such as ethylene or propylene, or a vinyl ester such as vinyl acetate. One of them may be used alone, or two or more of them may be used in combination.

Among the above-mentioned ones, ethylene, propylene or vinyl acetate is preferred, and ethylene is particularly preferred.

As the fluorinated copolymer (A), the following fluorinated copolymer (A1) or fluorinated copolymer (A2) is preferred.

Fluorinated copolymer (A1): a copolymer comprising constituting units (a) based on TFE and/or CTFE, constituting units (b) based on the cyclic hydrocarbon monomer, and constituting units (c1) based on a fluorinated monomer (excluding TFE and CTFE).

Fluorinated copolymer (A2): a copolymer comprising constituting units (a) based on TFE and/or CTFE, constituting units (b) based on the cyclic hydrocarbon monomer, and constituting units (c2) based on a non-fluorinated monomer (excluding the cyclic hydrocarbon monomer).

The fluorinated copolymer (A1) may further have constituting units other than the constituting units (a), constituting units (b) and constituting units (c1). As such other constituting units, constituting units (c2) based on a non-fluorinated monomer (excluding the cyclic hydrocarbon monomer) may, for example, be mentioned.

As the fluorinated copolymer (A1), particularly preferred is a TFE/perfluoro(alkyl vinyl ether) copolymer (PFA) which has, as constituting units (a), at least constituting units based on TFE and which has, as constituting units (c1), at least constituting units based on $CF_2=CFOR^{f1}$ as a fluorinated monomer.

Preferred specific examples of the fluorinated copolymer (A1) include a TFE/PPVE/NAH copolymer, a TFE/PPVE/IAH copolymer, a TFE/PPVE/CAH copolymer, a TFE/HFP/NAH copolymer, a TFE/HFP/IAH copolymer, a TFE/HFP/CAH copolymer, a TFE/VdF/IAH copolymer, a TFE/VdF/CAH copolymer, a TFE/PPVE/HFP/NAH copolymer, etc.

The fluorinated copolymer (A2) may further have constituting units other than the constituting units (a), constituting units (b) and constituting units (c2). As such other constituting units, constituting units (c1) based on a fluorinated monomer (excluding TFE and CTFE) may, for example, be mentioned.

As the fluorinated copolymer (A2), particularly preferred is a TFE/ethylene copolymer (ETFE) which has, as constituting units (a), at least constituting units based on TFE and which has, as constituting units (c2), at least constituting units based on ethylene as a non-fluorinated monomer.

Preferred specific examples of the fluorinated copolymer (A2) include a TFE/$CH_2$=$CH(CF_2)_4F$/NAH/ethylene copolymer, a TFE/$CH_2$=$CH(CF_2)_4F$/IAH/ethylene copolymer, a TFE/$CH_2$=$CH(CF_2)_4F$/CAH/ethylene copolymer, a TFE/$CH_2$=$CH(CF_2)_2F$/NAH/ethylene copolymer, a TFE/$CH_2$=$CH(CF_2)_2F$/IAH/ethylene copolymer, a TFE/$CH_2$=$CH(CF_2)_2F$/CAH/ethylene copolymer, a CTFE/$CH_2$=$CH(CF_2)_4F$/NAH/ethylene copolymer, a CTFE/$CH_2$=$CH(CF_2)_4F$/IAH/ethylene copolymer, a CTFE/$CH_2$=$CH(CF_2)_4F$/CAH/ethylene copolymer, a CTFE/$CH_2$=$CH(CF_2)_2F$/NAH/ethylene copolymer, a CTFE/$CH_2$=$CH(CF_2)_2F$/IAH/ethylene copolymer, a CTFE/$CH_2$=$CH(CF_2)_2F$/CAH/ethylene copolymer, etc.

The fluorinated copolymer (A) preferably comprises constituting units (a), constituting units (b) and constituting units (c), and the proportion of constituting units (b) to the total molar amount of constituting units (a), constituting units (b) and constituting units (c), is preferably from 0.01 to 5 mol %, more preferably from 0.1 to 3 mol %, particularly preferably from 0.1 to 2 mol %.

When the content of constituting units (b) is within the above range, the amount of dicarboxylic acid anhydride residual groups in the fluorinated copolymer (A) will be a proper amount, and the adhesion to the polyimide film and the adhesion between the fluorinated resin film and the conductor will be excellent.

Here, in a case where the fluorinated copolymer (A) comprises constituting units (a), constituting units (b) and constituting units (c), the content of constituting units (b) being 0.01 mol % to the total molar amount of constituting units (a), constituting units (b) and constituting units (c), corresponds to the content of dicarboxylic acid anhydride residual groups in the fluorinated copolymer (A) being 100 groups to $1\times10^6$ carbon atoms in the main chain of the fluorinated copolymer (A). The content of constituting units (b) being 5 mol % to the total molar amount of constituting units (a), constituting units (b) and constituting units (c), corresponds to the content of dicarboxylic acid anhydride residual groups in the fluorinated copolymer (A) being 50,000 groups to $1\times10^6$ carbon atoms in the main chain of the fluorinated copolymer (A).

In the fluorinated copolymer (A) having constituting units (b), the cyclic hydrocarbon monomer may partially be hydrolyzed and consequently, constituting units based on a dicarboxylic acid (such as itaconic acid, citraconic acid, 5-norbornene-2,3-dicarboxylic acid or maleic acid) corresponding to a dicarboxylic acid anhydride residual group, may be contained. In a case where constituting units based on such a dicarboxylic acid are contained, the content of such constituting units shall be included in constituting units (b).

In the fluorinated copolymer (A1), to the total molar amount of constituting units (a), constituting units (b) and constituting units (c1), it is preferred that constituting units (a) are from 50 to 99.89 mol %, constituting units (b) are from 0.01 to 5 mol %, and constituting units (c1) are from 0.1 to 49.99 mol %; it is more preferred that constituting units (a) are from 50 to 99.4 mol %, constituting units (b) are from 0.1 to 3 mol %, and constituting units (c1) are from 0.5 to 49.9 mol %; and it is particularly preferred that constituting units (a) are from 50 to 98.9 mol %, constituting units (b) are from 0.1 to 2 mol %, and constituting units (c1) are from 1 to 49.9 mol %.

When the contents of the respective constituting units are within the above ranges, the fluorinated copolymer (A1) will be excellent in heat resistance and chemical resistance, and a fluorinated resin film containing it will be excellent in elastic modulus at a high temperature.

Especially when the content of constituting units (b) is within the above range, as mentioned above, the adhesion to the polyimide film, and the adhesion between the fluorinated resin film and the conductor, will be excellent.

When the content of constituting units (c1) is within the above range, the fluorinated copolymer (A) will be excellent in moldability, and a fluorinated resin film containing it will be superior in mechanical properties such as stress cracking resistance, etc.

In a case where the fluorinated copolymer (A1) has constituting units (c2), the content of constituting units (c2) is preferably from 5 to 90 mol %, more preferably from 5 to 80 mol %, particularly preferably from 10 to 65 mol %, when the total molar amount of constituting units (a), constituting units (b) and constituting units (c1) is set to be 100 mol.

When the total molar amount of all constituting units in the fluorinated copolymer (A1) is set to be 100 mol %, the total molar amount of constituting units (a), constituting units (b) and constituting units (c1) is preferably at least 60 mol %, more preferably at least 65 mol %, particularly preferably at least 68 mol %. A preferred upper limit value is 100 mol %.

In the fluorinated copolymer (A2), to the total molar amount of constituting units (a), constituting units (b) and constituting units (c2), it is preferred that constituting units (a) are from 30 to 70 mol %, constituting units (b) are from 0.3 to 4.0 mol %, and constituting units (c2) are from 70 to 30 mol %; it is more preferred that constituting units (a) are from 40 to 60 mol %, constituting units (b) are from 0.5 to 3.5 mol %, and constituting units (c2) are from 40 to 60 mol %; and it is particularly preferred that constituting units (a) are from 50 to 60 mol %, constituting units (b) are from 0.5 to 2.5 mol %, and constituting units (c2) are from 40 to 50 mol %.

When the contents of the respective constituting units are within the above ranges, the fluorinated copolymer (A2) will be excellent in heat resistance and chemical resistance, and a fluorinated resin film containing it will be excellent in elastic modulus at a high temperature.

Especially when the content of constituting units (b) is within the above range, as mentioned above, the adhesion to the polyimide film, and the adhesion between the fluorinated resin film and the conductor, will be excellent.

When the content of constituting units (c2) is within the above range, the fluorinated copolymer (A) will be excellent in moldability, and a fluorinated resin film containing it will be excellent in flexibility and toughness.

In a case where the fluorinated copolymer (A2) has constituting units (c1), the content of constituting units (c1) is preferably from 0.3 to 4.0 mol %, more preferably from 0.5 to 3.5 mol %, particularly preferably from 0.7 to 3.0 mol %, when the total molar amount of constituting units (a), constituting units (b) and constituting units (c2) is set to be 100 mol.

When the total molar amount of all constituting units in the fluorinated copolymer (A2) is set to be 100 mol %, the total molar amount of constituting units (a), constituting units (b) and constituting units (c2) is preferably at least 96 mol %, more preferably at least 97 mol %, particularly preferably at least 98 mol %. A preferred upper limit value is 100 mol %.

The contents of the respective constituting units can be calculated by e.g. the melt NMR analysis, fluorine-content analysis, infrared absorption spectrum analysis, etc. of the fluorinated copolymer (A).

The melting point of the fluorinated copolymer (A) is from 220 to 320° C., preferably from 230 to 320° C., more preferably from 260 to 320° C.

When the fluorinated copolymer (A) is a fluorinated copolymer (A1), its melting point is preferably from 260 to 320° C., more preferably from 265 to 320° C., particularly preferably from 280 to 315° C. When the melting point of the fluorinated copolymer (A1) is at least the lower limit value in the above range, the heat resistance will be excellent, and when it is at most the upper limit value in the above range, the moldability will be excellent.

When the fluorinated copolymer (A) is a fluorinated copolymer (A2), its melting point is preferably from 230 to 280° C., particularly preferably from 240 to 270° C. When the melting point of the fluorinated copolymer (A2) is at least the lower limit value in the above range, the heat resistance will be excellent, and when it is at most the upper limit value in the above range, the moldability will be excellent.

The melting point of the fluorinated copolymer (A) can be adjusted by e.g. the types and contents of constituting units to constitute the fluorinated copolymer (A), the molecular weight, etc. For example, as the after-mentioned proportion of constituting units (a) increases, the melting point tends to increase.

In this specification, the fluorinated copolymer (A) shall include both the fluorinated copolymer (A1) and the fluorinated copolymer (A2).

The fluorinated copolymer (A) can be melt-molded. Here, "can be melt-molded" means that the copolymer exhibits melt-flowability.

In a preferred embodiment of the present invention, the melt flow rate (hereinafter referred to also as "MFR") of the fluorinated copolymer (A) as measured under a load of 49N at a temperature higher by at least 20° C. than the melting point of the fluorinated copolymer (A), is preferably from 0.1 to 1,000 g/10 min., more preferably from 0.5 to 100 g/10 min., further preferably from 1 to 30 g/min., particularly preferably from 5 to 25 g/min., most preferably from 5 to 20 g/min. When MFR is at least the lower limit value in the above range, the fluorinated copolymer (A) will be excellent in moldability, and a fluorinated resin film formed from such fluorinated copolymer (A) will be excellent in the surface smoothness and outer-appearance, and when MFR is at most the upper limit value in the above range, the fluorinated resin film containing such fluorinated copolymer (A) will be excellent in mechanical strength.

In a preferred embodiment of the present invention, MFR of the fluorinated copolymer (A1) as measured under a load of 49N at a temperature higher by at least 20° C. than the melting point of the fluorinated copolymer (A1), is preferably from 0.5 to 15 g/10 min., more preferably from 1 to 15 g/10 min., further preferably from 5 to 12 g/10 min., particularly preferably from 5 to 11 g/10 min., most preferably from 5 to 10 g/10 min. MFR of the fluorinated copolymer (A2) as measured under a load of 49N at a temperature higher by at least 20° C. than the melting point of the fluorinated copolymer (A2), is preferably from 0.5 to 25 g/10 min., more preferably from 1 to 25 g/10 min., further preferably from 5 to 25 g/10 min., particularly preferably from 10 to 25 g/10 min. When MFR is at most the upper limit value in the above range, the insulating tape containing the fluorinated copolymer (A1) or (A2), or a covering layer formed on the surface of a conductor by using such a tape, will be excellent in scrape abrasion resistance properties, and when MFR is at least the lower limit value in the above range, the moldability will be excellent.

As the temperature for measuring the above MFR, 372° C. is usually employed when the fluorinated copolymer (A) is a fluorinated copolymer (A1), and 297° C. is usually employed when the fluorinated copolymer (A) is a fluorinated copolymer (A2).

MFR is an index for the molecular weight of the fluorinated copolymer (A), i.e. the larger the MFR, the smaller the molecular weight, and the smaller the MFR, the larger the molecular weight. The molecular weight, accordingly MFR, of the fluorinated copolymer (A) can be adjusted by the production conditions for the fluorinated copolymer (A). For example, if the polymerization time is shortened during the polymerization of the monomers, MFR tends to increase. Further, if the fluorinated copolymer obtained by the polymerization reaction is subjected to thermal treatment, a cross-linking structure will be formed, and the molecular weight will increase, whereby MFR tends to be small.

The fluorinated copolymer (A) can be produced by a usual method.

As a method for producing a fluorinated copolymer (A) having functional groups (I), the following methods may, for example, be mentioned:

(1) A method of using a monomer having a functional group (I) at the time of producing a fluorinated copolymer (A) by a polymerization reaction.

(2) A method for producing a fluorinated copolymer (A) by a polymerization reaction using a radical polymerization initiator or a chain transfer agent having a functional group (I).

(3) A method of heating a fluorinated copolymer having no functional group (I) to partially heat-decompose the fluorinated copolymer to let reactive functional groups (e.g. carbonyl groups) be formed, thereby to obtain a fluorinated copolymer (A) having functional groups (I).

(4) A method of graft-polymerizing a monomer having a functional group (I) to a fluorinated copolymer having no functional group (I) to introduce functional groups (I) to the fluorinated copolymer.

As a method for producing a fluorinated copolymer (A), the method (1) is preferred.

In the case of producing a fluorinated copolymer (A) by a polymerization reaction, the polymerization method is not particularly limited, but, for example, a polymerization method using a radical polymerization initiator is preferred.

As such a polymerization method, bulk polymerization, solution polymerization using an organic solvent such as a fluorinated hydrocarbon, a chlorinated hydrocarbon, a fluorochloro-hydrocarbon, an alcohol or a hydrocarbon, suspension polymerization using an aqueous medium and, as the case requires, a suitable organic solvent, or emulsion polymerization using an aqueous medium and an emulsifier, may be mentioned, and among them, solution polymerization is preferred.

As the radical polymerization initiator, preferred is an initiator, whereby the temperature at which its half-life period is 10 hours, is from 0 to 100° C., and particularly preferred is an initiator, whereby such temperature is from 20 to 90° C.

Specific examples may be an azo compound such as azobisisobutyronitrile, a non-fluorinated diacyl peroxide such as isobutylyl peroxide, octanoyl peroxide, benzoyl peroxide or lauroyl peroxide, a peroxydicarbonate such as diisopropyl peroxydicarbonate, a peroxy ester such as tert-butyl peroxypivalate, tert-butyl peroxyisobutyrate or tert-butyl peroxy acetate, a fluorinated diacyl peroxide such as a compound represented by $(Z(CF_2)_rCOO)_2$ (wherein Z is a hydrogen atom, a fluorine atom or a chlorine atom, and r is an integer of from 1 to 10), an inorganic peroxide such as potassium peroxide, sodium peroxide or ammonium peroxide, etc.

At the time of polymerization, it is also preferred to use a chain transfer agent in order to control the melt viscosity of the fluorinated copolymer (A).

The chain transfer agent may, for example, be an alcohol such as methanol or ethanol, a chlorofluoro-hydrocarbon such as 1,3-dichloro-1,1,2,2,3-pentafluoropropane or 1,1-dichloro-1-fluoroethane, or a hydrocarbon such as pentane, hexane or cyclohexane.

As mentioned above, as at least one of the radical polymerization initiator and the chain transfer agent, a compound having a functional group (I) may be used. It is thereby possible to introduce functional groups (I) to main chain terminals of a fluorinated copolymer (A) to be produced.

Such a radical polymerization initiator may, for example, be di-n-propyl peroxydicarbonate, diisopropyl peroxycarbonate, t-butyl peroxyisopropyl carbonate, bis(4-t-butylcyclohexyl)peroxydicarbonate or di-2-ethylhexyl peroxydicarbonate, and such a chain transfer agent may, for example, be acetic acid, acetic anhydride, methyl acetate, ethylene glycol or propylene glycol.

As the solvent to be used for the solution polymerization, a perfluorocarbon, a hydrofluorocarbon, a chlorohydrofluorocarbon or a hydrofluoro ether may, for example, be used. The number of carbon atoms is preferably from 4 to 12.

Specific examples of the perfluorocarbon may be perfluorocyclobutane, perfluoropentane, perfluorohexane, perfluorocyclopentane, perfluorocyclohexane, etc.

Specific examples of the hydrofluorocarbon may be 1-hydroperfluorohexane, etc.

Specific examples of the chlorohydrofluorocarbon may be 1,3-dichloro-1,1,2,2,3-pentafluoropropane, etc.

Specific examples of the hydrofluoro ether may be methyl perfluorobutyl ether, 2,2,2-trifluoroethyl 2,2,1,1-tetrafluoroethyl ether, etc.

The polymerization conditions are not particularly limited, and the polymerization temperature is preferably from 0 to 100° C., particularly preferably from 20 to 90° C. The polymerization pressure is preferably from 0.1 to 10 MPa, particularly preferably from 0.5 to 3 MPa. The polymerization time is preferably from 1 to 30 hours.

In the case of the polymerization for a fluorinated copolymer (A) having constituting units (b), the concentration of the cyclic hydrocarbon monomer during the polymerization is preferably from 0.01 to 5 mol %, more preferably from 0.1 to 3 mol %, particularly preferably from 0.1 to 2 mol %, to all monomers. When the concentration of said monomer is within the above range, the polymerization speed during the production will be proper, and if the concentration of said monomer is too high, the polymerization speed tends to decrease.

During the polymerization, as the cyclic hydrocarbon monomer is consumed by the polymerization, it is preferred to continuously or intermittently supplement the consumed amount into the polymerization tank and to maintain the concentration of the cyclic hydrocarbon monomer to be within the above-mentioned range.

The fluorinated resin film may contain, as the case requires, another resin other than the fluorinated copolymer (A) within a range not to impair the effects of the present invention.

Such another resin is preferably a fluorinated resin (excluding the fluorinated copolymer (A)), since the dielectric constant and dielectric tangent are low, and the electrical properties are excellent.

The fluorinated resin (hereinafter referred to as "fluorinated resin (B)") as another resin, may, for example, be a copolymer which contains the above constituting units (a) and the above constituting units (c) and does not contain the above constituting units (b).

Specific examples of the fluorinated resin (B) may, for example, be a TFE/perfluoro(alkyl vinyl ether) copolymer (PFA), a TFE/HFP copolymer (FEP), ethylene/TFE copolymer (ETFE), polyvinylidene fluoride (PVDF), polychlorotrifluoroethylene (hereinafter referred to also as "PCTFE") and an ethylene/CTFE copolymer (ECTFE).

In a case where the fluorinated resin film contains a fluorinated resin (B), the content of the fluorinated resin (B) in the fluorinated resin film is preferably from 10 to 90 mass %, more preferably from 20 to 80 mass %, to the total amount (100 mass %) of the fluorinated copolymer (A) and the fluorinated resin (B). When the content of the fluorinated resin (B) is at least the lower limit value in the above range, the film will be excellent in heat resistance, and when it is at most the upper limit value in the above range, the film will be excellent in adhesion.

The fluorinated resin film may contain, as the case requires, additives within a range not to impair the effects of the present invention.

As such additives, inorganic fillers having low dielectric constants or dielectric tangents are preferred. Such inorganic fillers may, for example, be silica, clay, talc, calcium carbonate, mica, diatomaceous earth, alumina, zinc oxide, titanium oxide, calcium oxide, magnesium oxide, iron oxide, tin oxide, antimony oxide, calcium hydroxide, magnesium hydroxide, aluminum hydroxide, basic magnesium carbonate, magnesium carbonate, zinc carbonate, barium carbonate, dawsonite, hydrotalcite, calcium sulfate, barium sulfate, calcium silicate, montmorillonite, bentonite, activated white earth, sepiolite, imogolite, sericite, glass fiber, glass beads, silica balloons, carbon black, carbon nanotube, carbon nanohorn, graphite, carbon fiber, glass balloons, carbon burn, wood powder, zinc borate, etc. One type of inorganic fillers may be used alone, or two or more types may be used in combination.

An inorganic filler may be porous or non-porous. It is preferably porous in that the dielectric constant or dielectric tangent will be thereby further lower.

An inorganic filler may be one subjected to surface treatment with a surface treating agent such as a silane coupling agent or titanate coupling agent, in order to improve the dispersibility in the fluorinated copolymer (A).

In a case where an inorganic filler is contained, the content of the inorganic filler in the fluorinated resin film is preferably from 0.1 to 100 mass %, more preferably from 0.1 to 60 mass %, to the fluorinated copolymer (A).

The fluorinated resin film can be produced by a usual method. For example, it may be produced by molding, into a film form, the fluorinated copolymer (A) as it is, or a resin composition prepared by blending and kneading the fluorinated copolymer (A) with additives, by a known molding method such as extrusion molding or inflation molding.

Surface treatment may be applied to the surface of the fluorinated resin film, e.g. to the surface to be laminated with a polyimide film. The surface treatment method is not particularly limited and may be suitably selected among known surface treatment methods, such as corona discharge treatment, plasma treatment, etc.

The thickness of the fluorinated resin film is preferably from 1 to 1,000 μm, more preferably from 5 to 500 μm, particularly preferably from 10 to 250 μm. When the thickness of the fluorinated resin film is at least the lower limit value in the above range, the film will be excellent in electric insulating properties, and when it is at most the upper limit value in the above range, the film will be excellent in flexibility.

(Polyimide Film)

The polyimide film is a film made of a polyimide.

The polyimide to constitute the polyimide film is not particularly limited. It may be a polyimide having no thermoplasticity, or a thermoplastic polyimide.

The polyimide may, for example, be an aromatic polyimide. Particularly, a wholly aromatic polyimide to be produced by condensation polymerization of an aromatic polycarboxylic acid dianhydride and an aromatic diamine, is preferred.

A polyimide is usually obtained via a polyamic acid (polyimide precursor) by a reaction (polycondensation) of a polycarboxylic acid dianhydride (or its derivative) and a diamine.

A polyimide, particularly an aromatic polyimide, is insoluble in e.g. a solvent, or has a non-fusible nature, because of its rigid main chain structure. Therefore, firstly, by a reaction of a polycaboxylic acid dianhydride and a diamine, a polyimide precursor (a polyamic acid or polyamide acid) soluble in an organic solvent, is synthesized, and at this stage of a polyamic acid, molding processing is carried out by various methods. Thereafter, the polyamic acid is subjected to a dehydration reaction by heating or by a chemical method, for cyclization (imidation) to form a polyimide.

Specific examples of the aromatic polycarboxylic acid dianhydride may, for example, be pyromellitic dianhydride, 3,3',4,4'-benzophenone tetracarboxylic acid dianhydride, 2,2',3,3'-benzophenone tetracarboxylic acid dianhydride, 3,3',4,4'-biphenyl tetracarboxylic acid dianhydride, 2,2',3,3'-biphenyl tetracarboxylic acid dianhydride, 2,2-bis(2,3-dicarboxyphenyl)propane dianhydride, bis(3,4-dicarboxyphenyl) ether dianhydride, bis(3,4-dicarboxyphenyl)sulfone dianhydride, 1,1-bis(2,3-dicarboxyphenyl)ethane dianhydride, bis (2,3-dicarboxyphenyl)methane dianhydride, bis(3,4-dicarboxyphenyl)methane dianhydride, 2,2-bis(3,4-dicarboxyphenyl)-1,1,1,3,3,3-hexafluoropropane dianhydride, 2,3,6,7-naphthalene tetracarboxylic acid dianhydride, 1,4,5,8-naphthalene tetracarboxylic acid dianhydride, 1,2,5,6-naphthalene tetracarboxylic acid dianhydride, 1,2,3,4-benzene tetracarboxylic acid dianhydride, 3,4,9,10-perylene tetracarboxylic acid dianhydride, 2,3,6,7-anthracene tetracarboxylic acid dianhydride, 1,2,7,8-phenanthrene tetracarboxylic acid dianhydride, etc.

Further, a non-aromatic polycarboxylic acid dianhydride such as ethylene tetracarboxylic acid dianhydride or cyclopentane tetracarboxylic acid dianhydride may also be used as comparing favorably with an aromatic one.

One of these dianhydrides may be used alone, or two or more of them may be used as mixed.

Specific examples of the aromatic diamine may, for example, be m-phenylenediamine, o-phenylenediamine, p-phenylenediamine, m-aminobenzylamine, p-aminobenzylamine, 4,4'-diaminodiphenyl ether, 3,3'-diaminodiphenyl ether, 3,4'-diaminodiphenyl ether, bis(3-aminophenyl) sulfide, (3-aminophenyl)(4-aminophenyl) sulfide, bis(4-aminophenyl) sulfide, bis(3-aminophenyl) sulfide, (3-aminopheny)(4-aminophenyl) sulfoxide, bis(3-aminophenyl) sulfone, (3-aminopheny)(4-aminophenyl) sulfone, bis(4-aminophenyl) sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, bis[4-(3-aminophenoxy)phenyl]methane, bis[4-(4-aminophenoxy)phenyl]methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)phenyl]propane, 2,2-bis[4-(3-aminophenoxy)phenyl]butane, 2,2-bis[3-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(3-aminophenoxy)biphenyl, 4,4'-bis (4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfoxide, bis[4-(4-aminophenoxy)phenyl]sulfoxide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 1,4-bis[4-(3-aminophenoxy)benzoyl]benzene, 1,3-bis[4-(3-aminophenoxy)benzoyl]benzene, 4,4'-bis[3-(4-aminophenoxy)benzoyl]diphenyl ether, 4,4'-bis[3-(3-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenyl sulfone, bis[4-{4-(4-aminophenoxy)phenoxy}phenyl]sulfone, 1,4-bis[4-(4-aminophenoxy)phenoxy]-α,α-dimethylbenzyl]benzene, 1,3-bis[4-(4-aminophenoxy)-α,α-dimethylbenzyl]benzene, etc.

One of them may be used alone, or two or more of them may be used as mixed.

The polyimide film may contain, as the case requires, additives within a range not to impair the effects of the present invention.

As such additives, inorganic fillers having low dielectric constants or dielectric tangents are preferred. Such inorganic fillers may be the same ones as mentioned above in the description of the fluorinated resin film. One of such inorganic fillers may be used alone, or two or more of them may be used in combination.

The inorganic filler may be porous or non-porous. It is preferably porous in that the dielectric constant or dielectric tangent will be thereby further lower.

The inorganic filler may be one subjected to surface treatment with a surface treating agent such as a silane coupling agent or titanate coupling agent, in order to improve the dispersibility in the polyimide.

In a case where an inorganic filler is contained, the content of the inorganic filler in the polyimide film is preferably from 0.1 to 100 mass %, more preferably from 0.1 to 60 mass %, to the polyimide.

As the polyimide film, one produced by a known production method may be used, or a commercially available product may be used.

Surface treatment may be applied to the surface of the polyimide film, e.g. to the surface to be laminated with a fluorinated resin film. The surface treatment method is not particularly limited and may be suitably selected among known surface treatment methods, such as corona discharge treatment, plasma treatment, etc.

The thickness of the polyimide film is preferably from 1 to 1,000 μm, more preferably from 5 to 500 μm, particularly preferably from 5 to 250 μm. When the thickness of the polyimide film is at least the lower limit value in the above range, the film will be excellent in electric insulating properties, and when it is at most the upper limit value in the above range, the film will be excellent in flexibility.

(Method for Producing Insulating Tape)

The insulating tape of the present invention can be produced by laminating the fluorinated resin film on one or both surfaces of the polyimide film. After the lamination, in a case where the laminate is not in a tape-form, a step of processing the laminate into a tape-form may be conducted.

The method for laminating the polyimide film and the fluorinated resin film is not particularly limited so long as it is a method whereby these films can be directly laminated. However, with a view to improving the electrical properties and heat resistance of the insulating tape, a heat lamination process and an extrusion lamination process are preferred.

In the heat lamination process, preliminarily shaped fluorinated resin film and polyimide film are overlaid and heat-pressed to laminate these films.

As the heat pressing conditions, the temperature is preferably from 260 to 420° C., particularly preferably from 300 to 400° C. The pressure is preferably from 0.3 to 30 MPa, more preferably from 0.5 to 20 MPa, particularly preferably from 1 to 10 MPa. The time is preferably from 3 to 240 minutes, more preferably from 5 to 120 minutes, particularly preferably from 10 to 80 minutes. The heat pressing can be carried out by using a pressing plate, a roll, etc. As the pressing plate, a stainless steel plate is preferred.

In the extrusion lamination method, the fluorinated copolymer (A) or a resin composition containing it, is melted and extruded in the form of a film, which is laminated on the polyimide film.

The insulating tape of the present invention is used for covering a conductor. By covering the surface of a conductor with the insulating tape of the present invention, insulation of the conductor can be done.

In the present invention, the surface of a conductor wider than the insulating tape, is covered by the insulating tape so that the insulating tape overlaps itself, whereby it is possible to improve the adhesion of the overlapped insulating tape portions and to more certainly carry out insulation of the surface of the conductor.

Especially in a case where the insulating tape is one having the fluorinated resin film laminated on both surfaces of the polyimide film, the overlapped fluorinated resin film portions can be heat-sealed by the above thermal treatment, to enhance the above effects.

[Method for Producing Structure]

A first embodiment of the method for producing a structure of the present invention comprises a step of covering the surface of a conductor with the insulating tape for covering of the present invention, to form a covering layer, and a step of thermally treating the conductor covered with the covering layer at a temperature of at least the melting point of the fluorinated copolymer (A) to obtain a structure.

Basically, the conductor is not limited so long as it is a material having good electrical conductivity, and for example, a wire, rod or plate material of e.g. annealed copper, hard drawn copper, oxygen-free copper, chromium ore or aluminum, may be used. Further, in a case where mechanical strength is required for such a material, magnesium, silicon, iron, etc. may be added thereto.

The method for covering the conductor is not particularly limited, and a known covering method by an insulating tape may be employed depending upon the shape, etc. of the conductor to be covered.

As an example of a case where an electric cable (one having a wire conductor covered with an insulating tape) is produced as the structure, a method of winding an insulating tape spirally on a conductor, may be mentioned. Winding at that time is preferably carried out so that an edge of the insulating tape would overlap the previously-wound insulating tape itself.

The width of the overlapping portion may be changed depending upon the angle at the time of winding. The width of the overlapping portion (the overlap width) is preferably about 50% of the tape width.

The tension to be applied to the insulating tape at the time of winding may be changed within a wide range from a tension sufficient to avoid wrinkling to a sufficiently strong tension to cause neck down by pulling the insulating tape. Even if the tension is low, the insulating tape will shrink to some extent by the influence of heat during the subsequent thermal treatment to eventually tightly fit.

In a case where the insulating tape for covering of the present invention is one having a fluorinated resin film laminated on one surface of a polyimide film, it is preferred to carry out covering so that the fluorinated resin film side will be on the conductor side.

The thermal treatment after covering is carried out at a temperature of at least the melting point of the fluorinated copolymer (A) contained in the fluorinated resin film of the insulating tape. In a case where the fluorinated resin film comprises a plurality of fluorinated copolymers (A), the thermal treatment is carried out at a temperature of at least the melting point of a fluorinated copolymer (A) having the highest melting point. By such thermal treatment, the fluorinated resin film will be heat-sealed to the surface in contact therewith (i.e. to the surface of a conductor, or to the surface of a polyimide film or a fluorinated resin film), whereby the wound insulating tape will be sealed.

The conditions for such thermal treatment are not particularly limited so long as the temperature and time are sufficient for heat-sealing of the fluorinated resin film. However, the thermal treatment temperature is preferably at least the melting point of the fluorinated copolymer (A) and lower than 400° C., more preferably lower than 400° C. and higher by at least 20° C. and at most 100° C. than the melting point of the fluorinated copolymer (A) (e.g. at least 280° C. and at most 360° C. when the melting point of the fluorinated copolymer (A) is 260° C.), particularly preferably lower than 400° C. and higher by at least 20° C. and at most 80° C. than the melting point of the fluorinated copolymer (A). The higher the thermal treatment temperature, the shorter the time for sufficient sealing. The lower the thermal treatment temperature, the better the productivity.

The thermal treatment time depends on the thickness of the covering layer on the conductor surface, the gauge of the conductor, the speed of the production line, and the length of the sealing oven.

The layer obtained by thermally treating the covering layer will function as an insulating layer.

A second embodiment of the method for producing a structure of the present invention comprises a step of covering the surface of a conductor with the insulating tape for covering of the present invention to form a first covering layer, a step of covering the surface of the first covering layer with a tape containing polytetrafluoroethylene to form a second covering layer, and a step of thermally treating the conductor covered with the first and second covering layers at a temperature of at least the melting point of the fluorinated copolymer (A) to obtain a structure.

Here, in the present invention, the first covering layer is a covering layer which is disposed on the most conductor side among a plurality of covering layers formed on the surface of the conductor and which is directly in contact with the surface of the conductor. The second covering layer is a second covering layer, as counted from the conductor side, among the plurality of covering layers. In a case where covering layers are three or more layers, the third or subsequent covering layer will be likewise referred to.

The step of forming the first covering layer can be carried out in the same manner as the step of forming a covering layer in the first embodiment.

As the tape containing polytetrafluoroethylene, a non-sintered one is usually employed. In such a case, the subsequent thermal treatment may serve as a step of sintering the tape containing polytetrafluoroethylene.

Formation of the second covering layer by the tape containing polytetrafluoroethylene can be carried out in the same manner as the formation of the first covering layer.

The thermal treatment after forming the second covering layer can be carried out in the same manner as the thermal treatment in the first embodiment.

The layer formed by thermally treating the first and second covering layers will function as an insulating layer.

A third embodiment of the method for producing a structure of the present invention comprises a step of covering the surface of a conductor with a tape-form fluorinated resin film to form a first covering layer, a step of covering the surface of the first covering layer with a tape-form polyimide film to form a second covering layer, and a step of thermally treating the conductor covered with the first and second covering layers to obtain a structure, wherein the fluorinated resin film contains a fluorinated copolymer (A) which has at least one type of functional groups selected from the group consisting of carbonyl group-containing groups, hydroxy groups, epoxy groups and isocyanate groups and which has a melting point of from 230 to 320° C. and can be melt-molded, and the thermal treatment is conducted at a temperature of at least the melting point of the fluorinated copolymer (A).

The fluorinated resin film and the polyimide film may, respectively, be the same ones as mentioned above in the description of the insulating tape of the present invention.

Formations of the first and second covering layers by these films can, respectively, carried out in the same manner as in the steps of forming the respective covering layers in the first embodiment.

The thermal treatment after forming the second covering layer can be carried out in the same manner as in the thermal treatment in the first embodiment.

After forming the second covering layer and before carrying out the thermal treatment, a step of forming a third covering layer by covering the surface of the second covering layer with a tape containing polytetrafluoroethylene, may be carried out.

The layer formed by thermally treating the first and second covering layers (and optionally the third covering layer) will function as an insulating layer.

A fourth embodiment of the method for producing a structure of the present invention comprises a step of covering the surface of a conductor with a tape-form fluorinated resin film to form a first covering layer, a step of covering the surface of the first covering layer with a tape-form polyimide film to form a second covering layer, a step of covering the surface of the second covering layer with a tape-form fluorinated resin film to form a third covering layer, and a step of thermally treating the conductor covered with the first, second and third covering layers to obtain a structure, wherein each of the fluorinated resin films forming the first and third covering layers contains a fluorinated copolymer (A) which has at least one type of functional groups selected from the group consisting of carbonyl group-containing groups, hydroxy groups, epoxy groups and isocyanate groups and which has a melting point of from 230 to 320° C. and can be melt-molded, and the thermal treatment is conducted at a temperature of at least the melting point of the fluorinated copolymer (A).

The polyimide film and the fluorinated resin film may, respectively, be the same ones as mentioned above in the description of the insulating tape of the present invention.

Formations of the first to third covering layers by these films can, respectively, carried out in the same manner as in the steps of forming the respective covering layers in the first embodiment.

The thermal treatment after forming the third covering layer can be carried out in the same manner as in the thermal treatment in the first embodiment.

After forming the third covering layer and before carrying out the thermal treatment, a step of forming a fourth covering layer by covering the surface of the third covering layer with a tape containing polytetrafluoroethylene, may be carried out.

The layer formed by thermally treating the first to third covering layers (and optionally the fourth covering layer) will function as an insulating layer.

As described above, it is possible to obtain a structure comprising a conductor and an insulating layer covering the surface of the conductor.

Each of the structures obtainable by the production methods in the first to fourth embodiments, contains, in the insulating layer, a construction having a polyimide film and a fluorinated resin film directly laminated.

The fluorinated resin film to be used in the present invention contains the fluorinated copolymer (A), whereby it has high adhesion to the polyimide film, and peeling between such films is less likely to occur during or after the production of the structure, and therefore, deterioration in the insulating properties due to peeling between the films is less likely to occur.

Further, as it contains the fluorinated copolymer (A), the adhesion between the fluorinated resin film and the conductor (such as copper, aluminum or the like) covered with the insulating tape, and eventually, the adhesion between the insulating layer formed by the insulating tape and the conductor, are high, and peeling between them is less likely to occur during or after the production of the structure. Therefore, deterioration in the insulating properties due to peeling of the insulating layer from the conductor is less likely to occur. For example, in recent years, as a conductor, one made of aluminum has been increasingly used instead of conventional one made of copper, but, as compared with a conductor made of copper, a conductor made of aluminum tends to be poor in adhesion to an insulating layer. According to the present invention, however, it is possible to form an insulating layer with sufficient adhesion even to a conductor made of aluminum.

Further, in the present invention, a polyimide film is used in combination with the fluorinated resin film containing the fluorinated copolymer (A), whereby the insulating tape or the insulating layer thereby formed, is excellent in strength. For example, in a case where an insulating tape is to be wound on a conductor having a square cross-sectional shape, which has been increasingly used in recent years, a large load is likely to be exerted to the insulating tape at the angular portions of the conductor, whereby the insulating tape is likely to be ruptured, but the insulating tape of the present invention is less likely to be ruptured even in such a case.

Further, heretofore, in a case where the fluorinated resin film contained in the insulating layer has been only a PTFE tape, thermal treatment at a high temperature at a level of e.g. at least 400° C. has been required in order to sufficiently seal the insulating layer after covering. Whereas, in the present invention, even in a case where the outermost side is covered with a PTFE tape, sealing at a lower temperature becomes possible, as the fluorinated resin film containing the fluorinated copolymer (A) is interposed.

EXAMPLES

Now, the present invention will be described in further detail with reference to Examples. However, it should be understood that the present invention is by no means limited to the following Examples.

Among the following Ex. 1 to 21, Ex. 1 to 4 and 10 to 14 are Examples of the present invention, Ex. 5 to 9 and 15 to 19 are Comparative Examples, and Ex. 20 and 21 are Test Examples.

Materials and measuring methods used in Ex. are as follows.

[Materials]

Fluorinated copolymer (A1-1): TFE/NAH/PPVE copolymer (melting point: 300° C., MFR: 17.6 g/10 min.) obtained in Production Example 1 described hereinafter.

Fluorinated copolymer (A1-2): TFE/NAH/PPVE copolymer (melting point: 305° C., MFR: 11.0 g/10 min.) obtained in Production Example 5 described hereinafter.

PFA-1: TFE/perfluoro(alkyl vinyl ether) copolymer (melting point: 305° C., MFR: 13.6 g/10 min.) manufactured by Asahi Glass Company, Ltd., trade name: "Fluon PFA 73PT".

Fluorinated copolymer (A2-1): TFE/E/PFEE/IAH copolymer (melting point: 221° C., MFR: 20.5 g/10 min.) obtained in Production Example 2 described hereinafter.

Fluorinated copolymer (B-2): TFE/E/PFEE copolymer (melting point: 255° C., MFR: 30.5 g/10 min.) obtained in Production Example 3 described hereinafter.

Fluorinated copolymer (AB-3): Compound of fluorinated copolymers (A2-1) and (B-2) (melting point: 235° C., MFR: 21.3 g/10 min.) obtained in Production Example 4 described hereinafter.

ETFE-1: TFE/ethylene copolymer (melting point: 255° C., MFR: 10.9 g/10 min.) manufactured by Asahi Glass Company, Ltd., trade name: "Fluon ETFE C-88AX".

PTFE tape (thickness: 100 μm): a tape of polytetrafluoroethylene, manufactured by Nichias Corporation, trade name: "NAFLON".

Polyimide film (thickness: 75 μm): manufactured by Ube Industries, Ltd., trade name "UPILEX75S".

[Measuring Methods]

(Copolymer Composition of Fluorinated Copolymer)

The copolymer composition was obtained by a melt NMR analysis, a fluorine-content analysis and an infrared absorption spectrum analysis.

(Content of Functional Groups (I) in Fluorinated Copolymer)

Firstly, by the following infrared absorption spectrum analysis, the proportion of constituting units based on a monomer (NAH or IAH) having a functional group (I) in a fluorinated copolymer, was obtained.

The fluorinated copolymer was press-molded to obtain a film having a thickness of 200 μm. In the infrared absorption spectrum, each of the absorption peaks of the constituting units based on NAH and IAH in the fluorinated copolymer appears at 1,778 $cm^{-1}$. By measuring the absorbance at the absorption peak, and using a relational expression of M=aL, the content M (mol %) of constituting units based on IAH or NAH was determined. Here, L is the absorbance at 1,778 $cm^{-1}$, and a is a coefficient. As a, a=0.87 was used, which was determined by using IAH as the model compound.

And, from M (mol %), the number of functional groups (I) (acid anhydride groups) to $1 \times 10^6$ carbon atoms in the main chain of the fluorinated copolymer, is calculated to be $[a \times 10^6/100]$ groups.

(Melting Point (° C.) of Fluorinated Copolymer)

Using a differential scanning calorimeter (DSC apparatus) manufactured by Seiko Instruments Inc., the melting peak was recorded when the fluorinated copolymer (A) was heated at a rate of 10° C./min., whereupon the temperature (° C.) corresponding to the maximum value was taken as the melting point (Tm).

(MFR (g/10 Min.) of Fluorinated Copolymer)

Using a melt indexer manufactured by Technol Seven Co., Ltd., the mass (g) of a fluorinated copolymer flowing out in 10 minutes (unit time) from a nozzle having a diameter of 2 mm and a length of 8 mm under the following conditions was measured, and the obtained value was taken as MFR (g/10 min.).

Fluorinated copolymers A1-1 and A1-2, and PFA-1: at 372° C. under a load of 5 kg (49N).

Fluorinated copolymers A2-1, AB-3 and B-2, and ETFE-1: at 297° C. under a load of 5 kg (49N).

(Peel Strength in Insulating Tape)

An insulating tape was cut into a size having a length of 150 mm and a width of 10 mm to prepare a test film. From one end in the length direction of the test film to a position of 50 mm, the fluorinated resin film and the polyimide film were peeled. Then, setting the position of 50 mm from one end in the length direction of the test film at the center, by means of a tensile tester, 180° peeling was conducted at a tensile speed of 50 mm/min, whereby the maximum load was taken as the peel strength (N/10 mm). The larger the peel strength, the better the adhesion between the fluorinated resin film and the polyimide film.

In the above measurement, in a case where the peel strength is 0.2N/10 mm or less, variation in the measured values tends to be large, and therefore, in such cases, the results of peel strength were all represented to be at most 0.2N/10 mm.

(Peel Strength in Electric Cable)

At the time of preparing an electric cable, between an end portion of an insulating tape (width: 10 mm) spirally wound on a conductor, and the insulating tape in contact with the inside surface (on the conductor side) of the end portion, a peeling film (a stainless steel foil having a length of 50 mm, a width of 20 mm and a thickness of 50 μm, material: SUS304) was inserted to a position of 50 mm from one end of the peeling film, and in that state, thermal treatment was conducted under the predetermined conditions. With respect to an electric cable thereby obtained, the end portion of the insulating tape was peeled by using, as the starting point, the peeling film portion, i.e. the polyimide film and the fluorinated resin film were peeled, whereby the maximum load was taken as the peel strength (N/10 mm).

In a case where a fluorinated resin film at the inner surface side of the end portion of the insulating tape is thermally fusion-bonded to a fluorinated resin film in contact therewith (i.e. a fluorinated resin film at the outer side of the insulating film on the underside of the end portion), at the time of the above measurement, peeling occurs at the interface between the fluorinated resin film fusion-bonded to the end portion of the insulating tape, and the polyimide film in contact therewith. Therefore, the peel strength to be measured, is the peel strength between the fluorinated resin film and the polyimide film, and the larger the peel strength, the better the adhesion between the fluorinated resin film and the polyimide film.

In the above measurement, in a case where the peel strength is 0.2N/10 mm or less, variation in the measured values tends to be large, and therefore, in such cases, the results of peel strength were all represented to be at most 0.2N/10 mm.

(Abrasion Resistance (Scrape Abrasion Resistance Properties))

Each of electric cables prepared in Ex. 20 and 21 was cut out in a length of 2 m, and using "Magnet wire abrasion testing machine (reciprocation type)" trade name, manufactured by Yasuda Seiki Seisakusho, Ltd., the abrasion resistance was measured under the following conditions by a testing method in accordance with ISO6722-1.

Diameter of needle: 0.45±0.01 mm,
Material of needle: SUS316 (in accordance with JIS G7602),
Abrasion distance: 15.5±1 mm,
Abrasion speed: 55±5 times/min.,
Load: 7N,
Test environment: 23±1° C.

The abrasion resistance is represented by the number of reciprocation times of the needle, required until the electric cable conductor is exposed from the sheath by reciprocation of the needle. The more the abrasion resistance (reciprocation times), the better the scrape abrasion resistance properties.

[Production of Resins]

Production Example 1

Fluorinated copolymer (A1-1) was produced by using NAH (highmic anhydride, manufactured by Hitachi Chemical Co., Ltd) as a monomer to form constituting units (b) and PPVE ($CF_2=CFO(CF_2)_3F$, perfluoropropyl vinyl ether, manufactured by Asahi Glass Company, Ltd.) as a monomer to form constituting units (c1).

Firstly, 369 kg of 1,3-dichloro-1,1,2,2,3-pentafluoropropane (AK225cb, manufactured by Asahi Glass Company, Ltd.) (hereinafter referred to also as "AK225cb") and 30 kg of PPVE were charged into a preliminarily deaerated polymerization tank having an internal capacity of 430 L and equipped with a stirrer. Inside of this polymerization tank was heated to 50° C., and 50 kg of TFE was further charged, whereupon the pressure in the polymerization tank was raised to 0.89 MPa/G. Here, "0.89 MPa/G" represents that the gauge pressure is 0.89 MPa, and the same applies hereinafter.

Further, a polymerization initiator solution having (perfluorobutylyl) peroxide dissolved at a concentration of 0.36 mass % in AK225cb, was prepared, and while adding 3 L of the polymerization initiator solution into the polymerization tank continuously at a rate of 6.25 mL per one minute, polymerization was carried out. Further, TFE was continuously charged so as to maintain the pressure in the polymerization tank at 0.89 MPa/G during the polymerization reaction. Further, a solution having NAH dissolved at a concentration of 0.3 mass % in AK225cb, was continuously charged in an amount corresponding to 0.1 mol % to the number of moles of TFE charged during the polymerization.

After 8 hours from the initiation of polymerization, i.e. at the time when 32 kg of TFE was charged, the temperature in the polymerization tank was lowered to room temperature, and the pressure was purged to the atmospheric pressure. The obtained slurry was subjected to solid-liquid separation from AK225cb and then dried at 150° C. for 15 hours to obtain 33 kg of fluorinated copolymer (A1-1). The specific gravity of the obtained fluorinated copolymer (A1-1) was 2.15.

From the results of the melt NMR analysis and the infrared absorption spectrum analysis, the copolymer composition of this fluorinated copolymer (A1-1) was found to be constituting units based on TFE/constituting units based on NAH/constituting units based on PPVE=97.9/0.1/2.0 (mol %).

Production Example 2

A stainless steel polymerization tank having an internal capacity of 94 L and equipped with a stirrer, was deaerated, and 69.7 kg of perfluoropentyldifluoromethane, 22.3 kg of AK225cb, 528 g of $CH_2=CH(CF_2)_2F$, 13.3 kg of TFE and 456 g of ethylene (hereinafter referred to also as "E") were injected, and inside of the polymerization tank was heated to 66° C. The pressure at that time was 1.49 MPa/G. As a polymerization initiator, 19 g of tert-butyl peroxypivalate was charged to initiate polymerization. A monomer mixed gas having a molar ratio of TFE/E=60/40 was continuously charged so as to adjust the pressure during polymerization to be constant. Further, $CH_2=CH(CF_2)_2F$ in an amount corresponding to 3 mol % and itaconic anhydride (IAH) in an amount corresponding to 0.3 mol %, to the total number of moles of TFE and E to be charged during polymerization, were continuously charged. After 5.6 hours from the initiation of polymerization, i.e. at the time when 11.5 kg of the monomer mixed gas was charged, the inside temperature of the polymerization tank was cooled to room temperature, and at the same time, the pressure in the polymerization tank was purged to the atmospheric pressure.

The obtained slurry was put into a 300 L granulation tank having 100 kg of water charged and heated to 105° C. with stirring to distil off the solvent, for granulation. The obtained granules were dried at 135° C. for 3 hours to obtain 12.2 kg of granules of fluorinated copolymer (A2-1).

From the results of the melt NMR analysis and the infrared absorption spectrum analysis, the copolymer composition of this fluorinated copolymer (A2-1) was found to be constituting units based on TFE/constituting units based on E/constituting units based on $CH_2$=$CH(CF_2)_2F$/constituting units based on IAH=58.2/38.4/3.1/0.3 (molar ratio).

Production Example 3

A stainless steel polymerization tank having an internal capacity of 94 L and equipped with a stirrer, was deaerated, and 71.0 kg of perfluoropentyldifluoromethane, 27.3 kg of AK225cb, 150 g of $CH_2$=$CH(CF_2)_2F$, 12.6 kg of TFE and 752 g of E were injected, and inside of the polymerization tank was heated to 66° C. The pressure at that time was 1.53 MPa/G. As a polymerization initiator, 9 g of tert-butyl peroxypivalate was charged to initiate polymerization. A monomer mixed gas having a molar ratio of TFE/E=51/46 was continuously charged so as to adjust the pressure during polymerization to be constant. Further, $CH_2$=$CH(CF_2)_2F$ in an amount corresponding to 0.7 mol % to the total number of moles of TFE and E to be charged during polymerization, were continuously charged. After 5.7 hours from the initiation of polymerization, i.e. at the time when 11.5 kg of the monomer mixed gas was charged, the inside temperature of the polymerization tank was cooled to room temperature, and at the same time, the pressure in the polymerization tank was purged to the atmospheric pressure.

Granulation was conducted in the same manner as in Production Example 2 except that the obtained slurry was used, to obtain 12.5 kg of granules of fluorinated copolymer (B-2).

From the results of the melt NMR analysis and the infrared absorption spectrum analysis, the copolymer composition of this fluorinated copolymer (B-2) was found to be constituting units based on TFE/constituting units based on E/constituting units based on $CH_2$=$CH(CF_2)_2F$=53.7/45.6/0.7 (molar ratio).

Production Example 4

20 Parts by mass of fluorinated copolymer (A2-1) and 80 parts by mass of fluorinated copolymer (B-2) were dry-blended and then, melt-kneaded at a temperature of 260° C. for a retention time of 2 minutes by means of a twin screw extruder to obtain fluorinated copolymer (AB-3).

Production Example 5

Fluorinated copolymer (A1-1) obtained in Production Example 1, was subjected to thermal treatment at 260° C. for 24 hours to obtain fluorinated copolymer (A1-2). [Production of fluorinated resin films]

Production Example 6

Fluorinated copolymer (A1-1) was extrusion-molded by means of a 30 mmφ single screw extruder having a 750 mm width coat hanger die, to obtain a fluorinated resin film having a thickness of 50 μm (hereinafter referred to also as "film 1"). The screw L/D ratio of the apparatus was 24, and the screw CR was 3. The molding conditions were as follows.

Cylinder temperature: C1=300° C., C2=320° C., C3=340° C.,
Adapter temperature: 340° C.,
Head temperature: 340° C.,
Die temperature: 340° C.,
Screw rotational speed: 10 rpm,
Taking-up speed: 5 m/min.

Production Examples 7 and 8

A fluorinated resin film (hereinafter referred to also as "film 2" or "film 5") was prepared under the same conditions as in Production Example 6, except that instead of fluorinated copolymer (A1-1), PFA-1 or fluorinated copolymer (A1-2) was used.

Production Example 9

A fluorinated resin film (hereinafter referred to also as "film 3") was prepared in the same manner as in Production Example 6, except that instead of fluorinated copolymer (A1-1), fluorinated copolymer (AB-3) was used, and the molding conditions were as follows.

Cylinder temperature: C1=260° C., C2=300° C., C3=300° C.,
Adapter temperature: 320° C.,
Head temperature: 320° C.,
Die temperature: 320° C.,
Screw rotational speed: 10 rpm,
Taking-up speed: 5 m/min.

Production Example 10

A fluorinated resin film (hereinafter referred to also as "film 4") was prepared under the same conditions as in Production Example 9, except that instead of fluorinated copolymer (AB-3), ETFE-1 was used.

Production of Insulating Tapes

Ex. 1

Film 1 and polyimide film were laminated in the order of film 1/polyimide film/film 1 and pressed for 5 minutes under conditions of a temperature of 320° C. and a pressure of 10 MPa, to obtain an insulating tape. The peel strength between the fluorinated resin film and the polyimide film was measured, and the result is shown in Table 1.

Ex. 2 to 10

Insulating tapes were obtained in the same manner as in Ex. 1 except that the types and lamination order of films laminated, and the pressing temperature, were changed as shown in Table 1. The peel strength between the fluorinated resin film and the polyimide film was measured, and the result is shown in Table 1.

TABLE 1

| | Ex. 1 | Ex. 2 | Ex. 3 | Ex. 4 | Ex. 5 |
|---|---|---|---|---|---|
| Construction | Film 1/ polyimide/ film 1 | Film 1/ polyimide/ film 1 | Film 3/ polyimide/ film 3 | Film 3/ polyimide/ film 3 | Film 2/ polyimide/ film 2 |
| Pressing temperature (° C.) | 320 | 360 | 310 | 330 | 320 |

TABLE 1-continued

| Peel strength (N/10 mm) | 4.4 | 6.5 | 3.5 | 5.0 | At most 0.2 |
|---|---|---|---|---|---|
| | Ex. 6 | Ex. 7 | Ex. 8 | Ex. 9 | Ex. 10 |
| Construction | Film 4/ polyimide/ film 4 | PTFE/ polyimide/ PTFE | Film 2/ polyimide/ film 2 | PTFE/ polyimide/ PTFE | Film 5/ polyimide/ film 5 |
| Pressing temperature (° C.) | 330 | 320 | 360 | 360 | 360 |
| Peel strength (N/10 mm) | At most 0.2 | At most 0.2 | At most 0.2 | At most 0.2 | 5.7 |

Insulating tapes in Ex. 1 to 4 and Ex. 10, wherein film 1, film 3 or film 5 was used as the fluorinated resin film, were excellent in adhesion between the fluorinated resin film and the polyimide film.

On the other hand, insulating tapes in Ex. 5 to 9, wherein film 2 (PFA film), film 4 (ETFE film) or PTFE tape was used as the fluorinated resin film, were inadequate in adhesion between the fluorinated resin film and the polyimide film.

Production of Structures

Ex. 11

The insulating tape (film 1/polyimide film/film 1) prepared in Ex. 2 was spirally wound around a conductor for an electric cable (core wire diameter φ: 1.8 mm, material: tin-plated annealed copper) so that 50% of the tape width of the insulating tape would overlap the tape itself. This assembly was put in an oven and heated for one hour under a condition of an oven temperature of 360° C. to prepare an electric cable.

With respect to this electric cable, the peel strength between the fluorinated resin film and the polyimide film was measured. The result is shown in Table 2.

<Peeling when Wound on Mandrel (Copper Wire)>

The above insulating tape was wound around a conductor for an electric cable in the same manner as above except that the insulating tape was made not to overlap itself. This assembly was put in an oven and heated for one hour under a condition of an oven temperature of 360° C. to prepare an electric cable. This electric cable was wound on a mandrel having a diameter of 20 mm, whereupon the presence or absence of peeling between the insulating tape and the conductor was visually ascertained. The result judged by the following standards is shown in Table 2.

○ (good): No peeling observed.
x (no good): Peeling observed.

<Peeling when Wound on Mandrel (Aluminum Wire)>

An electric cable was prepared in the same manner as in "Peeling when wound on mandrel (copper wire)" except that the material of conductor was changed from tin-plated annealed copper to aluminum (A1070: JIS). This electric cable was wound on a mandrel having a diameter of 20 mm, whereupon the presence or absence of peeling between the insulating tape and the conductor was visually ascertained. The result judged by the following standards is shown in Table 2.

○ (good): No peeling observed.
x (no good): Peeling observed.

Ex. 12

The insulating tape (film 1/polyimide film/film 1) prepared in Ex. 2 was spirally wound around a conductor for an electric cable (core wire diameter φ: 1.8 mm, material: tin-plated annealed copper) so that 50% of the tape width of the insulating tape would overlap the tape itself. Then, a PTFE tape was spirally wound thereon, so that it overlaps itself. This assembly was put in an oven and heated for one hour under a condition of an oven temperature of 360° C. to prepare an electric cable.

With respect to this electric cable, the peel strength between the fluorinated resin film and the polyimide film was measured. Further, peeling when wound on mandrel (copper wire) and peeling when wound on mandrel (aluminum wire) were ascertained. The results are shown in Table 2.

Ex. 14 to 15, and Ex. 18 to 19

An electric cable was prepared in the same manner as in Ex. 11 except that the type of the insulating tape and the oven temperature at the time of heating in the oven were changed. With respect to this electric cable, the peel strength between the fluorinated resin film and the polyimide film was measured. Further, peeling when wound on mandrel (copper wire) and peeling when wound on mandrel (aluminum wire) were ascertained. The results are shown in Table 2.

However, in Ex. 18 to 19, under the above heating condition, at the overlapped portions of the insulating tape, the fluorinated resin films were not closely adhered to each other, whereby measurement of the peel strength was impossible.

Ex. 13 and 16 to 17

An electric cable was prepared in the same manner as in Ex. 12 except that the oven temperature at the time of heating in the oven, or the type of the insulating tape was changed. With respect to this electric cable, the peel strength between the fluorinated resin film and the polyimide film was measured. Further, peeling when wound on mandrel (copper wire) and peeling when wound on mandrel (aluminum wire) were ascertained. The results are shown in Table 2.

TABLE 2

| | Ex. 11 | Ex. 12 | Ex. 13 | Ex. 14 | Ex. 15 |
|---|---|---|---|---|---|
| First covering layer | Insulating tape in Ex. 2 | Insulating tape in Ex. 2 | Insulating tape in Ex. 2 | Insulating tape in Ex. 4 | Insulating tape in Ex. 6 |
| Second covering layer | — | PTFE tape | PTFE tape | — | — |
| Oven temperature (° C.) | 360 | 360 | 320 | 330 | 330 |

TABLE 2-continued

| Peel strength (N/10 mm) | 9.6 | 9.1 | 6.4 | 7.3 | At most 0.2 |
|---|---|---|---|---|---|
| Peeling when wound on mandrel (copper wire) | ○ | ○ | ○ | ○ | x |
| Peeling when wound on mandrel (aluminum wire) | ○ | ○ | ○ | ○ | x |

| | Ex. 16 | Ex. 17 | Ex. 18 | Ex. 19 |
|---|---|---|---|---|
| First covering layer | Insulating tape in Ex. 8 | Insulating tape in Ex. 9 | Insulating tape in Ex. 8 | Insulating tape in Ex. 9 |
| Second covering layer | PTFE tape | PTFE tape | — | — |
| Oven temperature (° C.) | 360 | 360 | 320 | 320 |
| Peel strength (N/10 mm) | At most 0.2 | At most 0.2 | Impossible to measure | Impossible to measure |
| Peeling when wound on mandrel (copper wire) | x | x | x | x |
| Peeling when wound on mandrel (aluminum wire) | x | x | x | x |

As shown in Table 2, in Ex. 11 to 14 wherein the conductor was covered by the insulating tape of Ex. 2 or Ex. 4 using film 1 or film 3 as the fluorinated resin film, it was possible to sufficiently tightly adhere the wound insulating tape by thermal treatment at a temperature of from 320 to 360° C. Further, the adhesion between the insulating tape and the conductor for an electric cable was excellent.

On the other hand, in Ex. 15 to 19 wherein the conductor was covered by the insulating tape of Ex. 6, Ex. 8 or Ex. 9 using film 4 (ETFE film), film 2 (PFA film) or a PTFE tape, as the fluorinated resin film, it was not possible to sufficiently adhere the wound insulating tape. Further, the adhesion between the insulating tape and the conductor for an electric cable was inadequate.

When the results in Ex, 12 to 13, 16 and 17 wherein a PTFE tape was wound on the insulating tape of Ex. 2, 8 or 9, are compared, in Ex. 12 to 13, the PTFE tape wound on the insulating tape of Ex. 2 was sufficiently tightly adhered to the insulating tape of Ex. 2.

When the results in Ex. 2, 8 and 9 shown in Table 1 and the results in Ex. 12, 16 and 17 shown in Table 2 are compared, in the case of the insulating tape in Ex. 2, by carrying out heating after winding, at a temperature of 360° C., the peel strength between film 1 and the polyimide film was increased from 6.5 N/10 mm to 9.1 N/10 mm. Such a large increase in the peel strength was not observed in the cases of the insulating tapes in Ex. 8 and 9.

Likewise, when the results in Ex. 4 and 6 shown in Table 1 and the results in Ex. 14 and 15 shown in Table 2 are compared, in the case of the insulating tape in Ex. 4, by carrying out heating after winding, at a temperature of 330° C., the peel strength between film 3 and the polyimide film was increased from 5.0 N/10 mm to 7.3 N/10 mm. Such a large increase in the peel strength was not observed in the case of the insulating tape in Ex. 6.

From the above results, it has been confirmed that the insulating tape of the present invention is useful in an application to obtain a structure by covering the surface of a conductor, followed by thermal treatment.

Ex. 20

An electric cable comprising an electric wire conductor and a sheath covering the electric wire conductor, was prepared by the following procedure.

Fluorinated copolymer (A1-1) was pelletized by a twin screw extruder (manufactured by Technovel Corporation). By using the obtained pellets, fluorinated copolymer (A1-1) was extruded under the following conditions around an electric wire conductor (core wire diameter ϕ: 1.8 mm, stranded wire) to form a sheath thereby to obtain an electric cable having a cable diameter ϕ of 2.8 mm and a sheath thickness of 0.5 mm.

Cylinder temperature: 350 to 390° C.,
Die temperature: 390° C.,
Taking-up speed: 10 to 30 m/min.

With respect to the obtained electric cable, the abrasion resistance was measured, whereby the abrasion resistance was found to be 3,274 times.

Ex. 21

An electric cable was prepared in the same manner as in Ex. 20 except that fluorinated copolymer (A1-1) was changed to fluorinated copolymer (A1-2).

With respect to the obtained electric cable, the abrasion resistance was measured, whereby the abrasion resistance was found to be 16,954 times, and thus, the scrape abrasion resistance property was better than in Ex. 20.

INDUSTRIAL APPLICABILITY

The structure of the present invention is useful for an electric cable, particularly for a coil for a motor, a cable or an electric cable for aircraft.

This application is a continuation of PCT Application No. PCT/JP2014/067704, filed on Jul. 2, 2014, which is based upon and claims the benefit of priority from Japanese Patent Application No. 2013-140960 filed on Jul. 4, 2013 and Japanese Patent Application No. 2013-257487 filed on Dec.

12, 2013. The contents of those applications are incorporated herein by reference in their entireties.

What is claimed is:

1. A method for producing a structure, comprising:
covering the surface of a conductor with an insulating tape to form a covering layer; and
thermally treating the conductor covered with the covering layer at a temperature of at least the melting point of the fluorinated copolymer (A) to obtain a structure,
wherein the insulating tape comprises a polyimide film and a fluorinated resin film directly laminated on one or both surfaces of the polyimide film,
wherein the fluorinated resin film comprises a fluorinated copolymer (A) which has a melting point of from 220 to 320° C. and can be melt-molded, and the fluorinated copolymer (A) comprises at least one functional group selected from the group consisting of carbonyl group-containing groups, hydroxy groups, epoxy groups and isocyanate groups.

2. The method for producing a structure according to claim 1, wherein the thermal treatment is conducted at a temperature of at least the melting point of the fluorinated copolymer (A) and lower than 400° C.

3. The method for producing a structure according to claim 1, wherein the structure is an electric cable.

4. The method for producing a structure according to claim 1, wherein the melting point of the fluorinated copolymer (A) is from 260 to 320° C.

5. The method for producing a structure according to claim 1, wherein the fluorinated copolymer (A) comprises a carbonyl group-containing group, wherein the carbonyl group-containing group is at least one selected from the group consisting of groups containing a carbonyl group between carbon atoms of a hydrocarbon group, carbonate groups, carboxy groups, haloformyl groups, alkoxycarbonyl groups and acid anhydride residual groups.

6. The method for producing a structure according to claim 1, wherein a content of the functional groups is from 10 to 60,000 groups to $1 \times 10^6$ carbon atoms in the main chain of the fluorinated copolymer (A).

7. The method for producing a structure according to claim 1, wherein the fluorinated copolymer (A) has a melt flow rate of from 0.5 to 15 g/10 min., as measured at 372° C. under a load of 49N.

8. The method for producing a structure according to claim 1, wherein the fluorinated copolymer (A) has a melt flow rate of from 0.5 to 25 g/10 min., as measured at 297° C. under a load of 49N.

9. The method for producing a structure according to claim 1, wherein the fluorinated copolymer (A) is a tetrafluoroethylene/perfluoro(alkyl vinyl ether) copolymer (PFA) or a tetrafluoroethylene/ethylene copolymer (ETFE).

* * * * *